United States Patent
Gines et al.

(10) Patent No.: US 10,882,695 B2
(45) Date of Patent: Jan. 5, 2021

(54) LOAD HANDLING SYSTEM AND METHOD

(71) Applicant: Dematic Corp., Grand Rapids, MI (US)

(72) Inventors: Paul K. Gines, Kaysville, UT (US); Mark Jarva, Draper, UT (US); Mark D. Yardley, Hooper, UT (US); Paul T. Carter, Sandy, UT (US)

(73) Assignee: Dematic Corp., Grand Rapids, MI (US)

( * ) Notice: Subject to any disclaimer, the term of this patent is extended or adjusted under 35 U.S.C. 154(b) by 138 days.

(21) Appl. No.: 16/296,854

(22) Filed: Mar. 8, 2019

(65) Prior Publication Data

US 2019/0276235 A1   Sep. 12, 2019

Related U.S. Application Data

(60) Provisional application No. 62/640,181, filed on Mar. 8, 2018.

(51) Int. Cl.
*G06F 7/00* (2006.01)
*B65G 1/137* (2006.01)
*B65G 1/04* (2006.01)

(52) U.S. Cl.
CPC ......... B65G 1/1375 (2013.01); B65G 1/0435 (2013.01); B65G 1/1376 (2013.01)

(58) Field of Classification Search
CPC .. B65G 1/1375; B65G 1/0435; B65G 1/1376; B65G 1/0407
USPC .................. 700/213–216, 218, 228, 230
See application file for complete search history.

(56) References Cited

U.S. PATENT DOCUMENTS

| | | | | |
|---|---|---|---|---|
| 5,351,809 A | * | 10/1994 | Gilmore | B65G 21/14 198/594 |
| 6,923,612 B2 | | 8/2005 | Hansl | |
| 7,168,555 B2 | | 1/2007 | Peterson | |
| 9,994,394 B2 | * | 6/2018 | Masuda | B65G 1/0435 |
| 2006/0285947 A1 | | 12/2006 | Hansl et al. | |

OTHER PUBLICATIONS

International Search Report and Written Opinion of the International Searching Authority from corresponding Patent Cooperation Treaty (PCT) Application No. PCT/IB2019/051916, dated Jul. 17, 2019.
Preliminary Report on Patentability of the International Searching Authority from corresponding Patent Cooperation Treaty (PCT) Application No. PCT/IB2019/051916, completed Sep. 8, 2020.

* cited by examiner

*Primary Examiner* — Yolanda R Cumbess
(74) *Attorney, Agent, or Firm* — Gardner, Linn, Burkhart & Ondersma LLP

(57) ABSTRACT

A load handling system and method of handling a load includes a load handling device with a load support that is configured for engaging a load and a first drive is adapted to drive said load support with respect to a load. A conveyor is moveable along the load support and a second drive is adapted to propel the conveyor with respect to the load support. The first and second drives are operated to handle a load. The load support may be a pair of forks or a platen or the like.

15 Claims, 19 Drawing Sheets

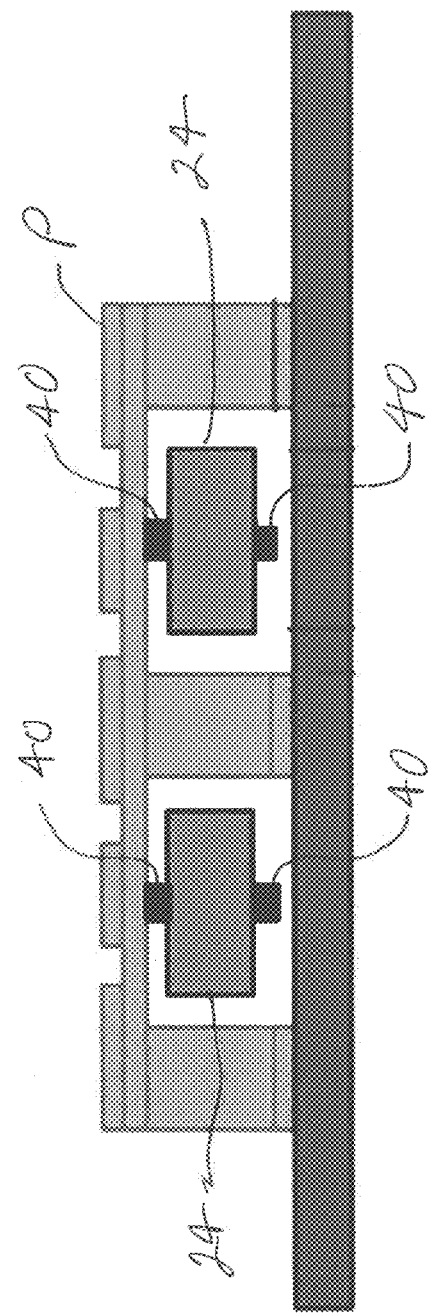

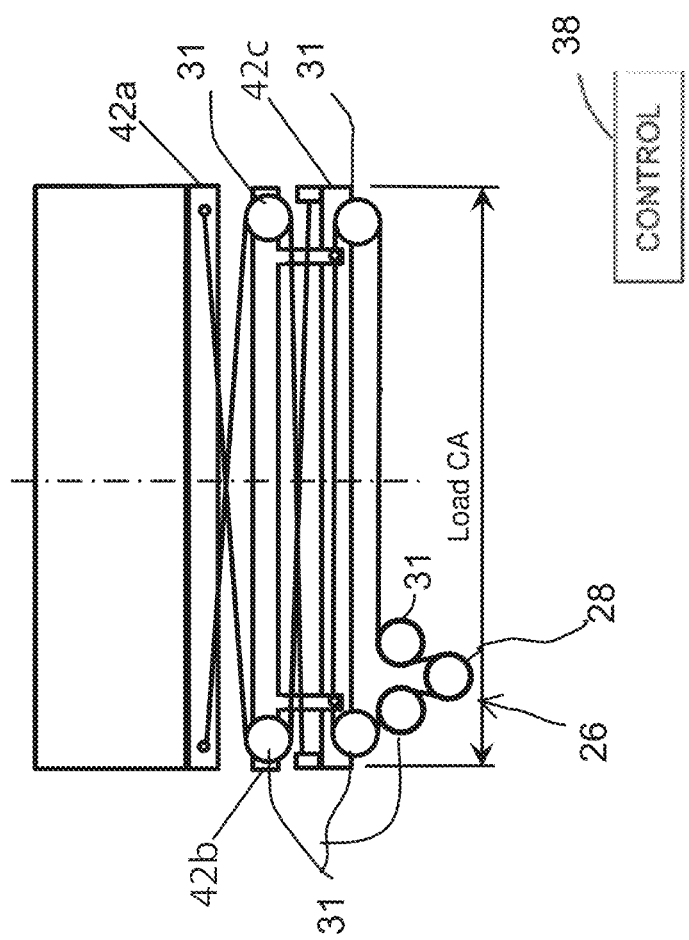

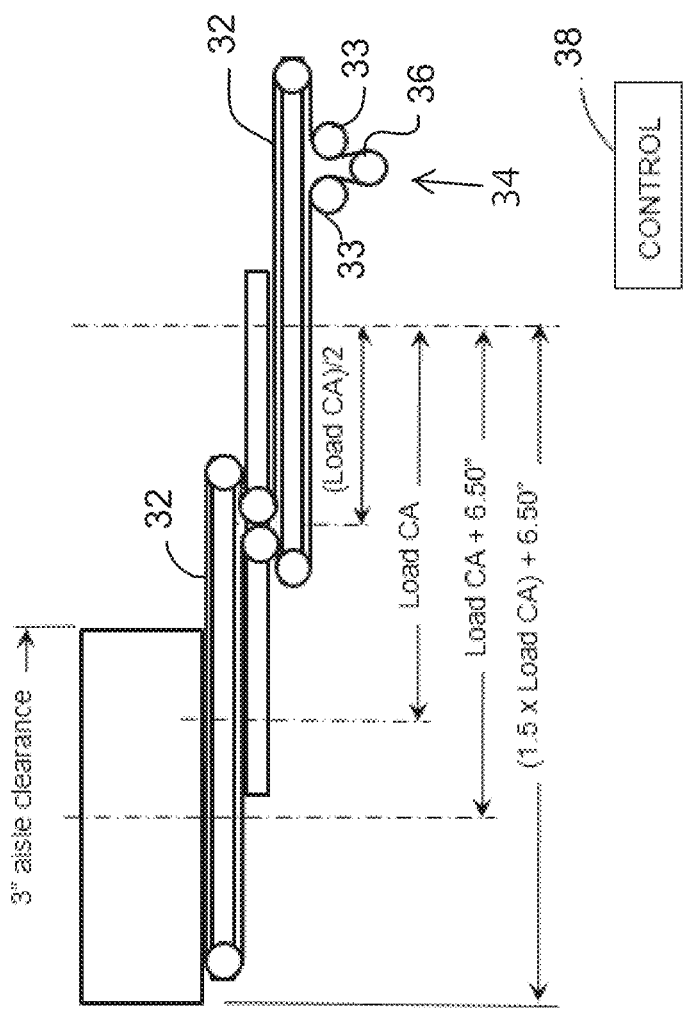

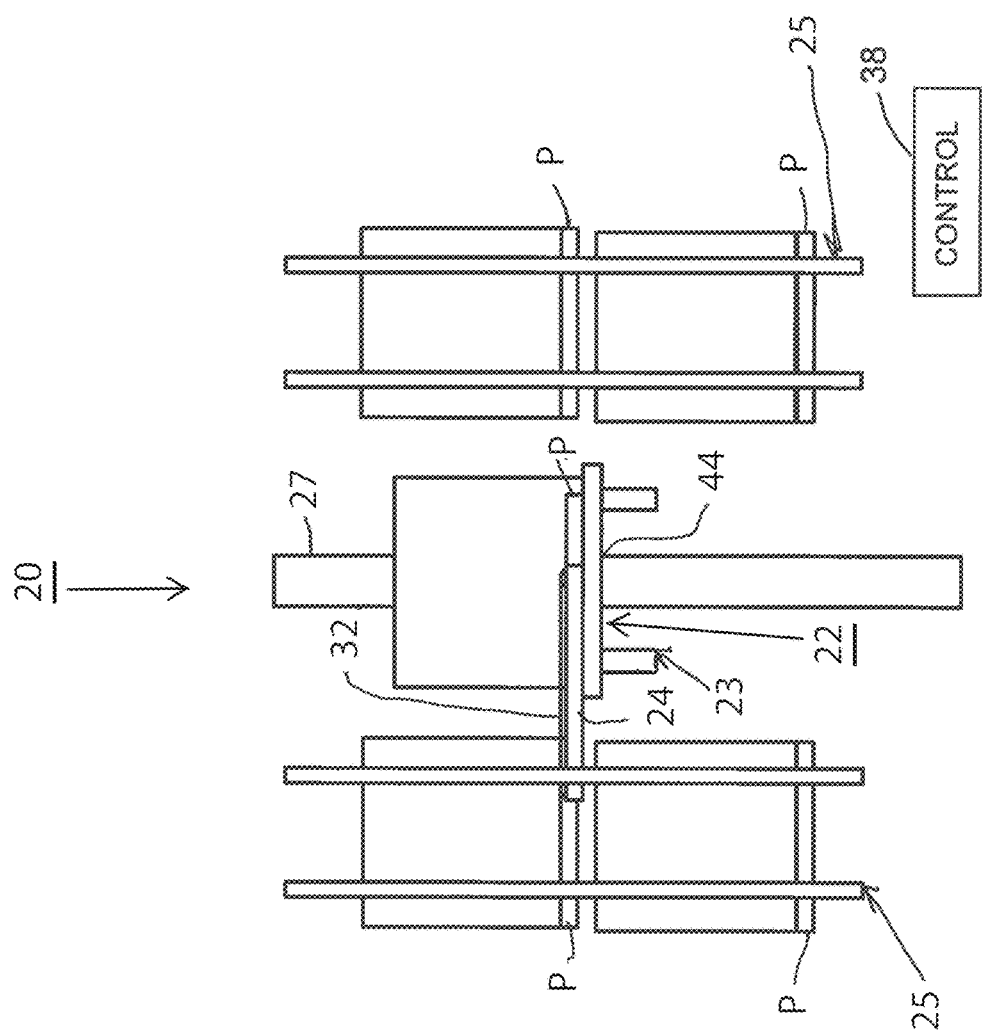

LOAD HANDLING SYSTEM AND METHOD

CROSS REFERENCE TO RELATED APPLICATIONS

The present application claims priority of U.S. provisional application Ser. No. 62/640,181, filed Mar. 8, 2018, which is hereby incorporated herein by reference in its entirety.

BACKGROUND OF THE INVENTION

The present invention is directed to a material handling system and method and, in particular, to a load handling system and method. While the invention is illustrated for use with an automated storage and retrieval system (AS/RS), it has other load handling applications.

Load cycle time to pick/retrieve a load of goods ("load") from a rack in an AS/RS, or to deposit a load, is an important performance criteria that dictates system throughput. While there are various steps in the process, such as transporting the load of goods to/from the desired rack location, a significant portion of the time is spent in picking the load from a rack or depositing the load to the racks, also known as load handling. Indeed, it is common for 30% to 40% of the operational time of an AS/RS to be spent in such load handling.

A known technique for improving system performance is to use larger motors throughout the system to speed up its performance. However, such "turbo boost" provides only marginal speed improvement and adds significant installed cost to the system.

SUMMARY OF THE INVENTION

The present invention significantly improves the speed of load handling and therefore overall system throughput. This is accomplished in a manner that does not compromise stability of product stack and does not require larger motors or increased performance. The invention can even be implemented in conjunction with larger motors and enhanced performance parameters to provide even greater system throughput. The invention can be used advantageously with both a platen configuration typically used in the USA and other countries, and with a fork configuration to interface the Euro pallet design typically used in Europe and other countries. The invention can be used with AS/RS loads.

A load handling system and method of handling a load, according to an aspect of the invention, includes a load handling device having a load support that is configured for engaging the load, and a first drive that is adapted to drive the load support with respect to a load. A conveyor is moveable along the load support and a second drive is adapted to propel the conveyor with respect to the load support. The first and second drives are operated to handle a load.

The first and second drives may be operated independently from each other. The load support may be at least two forks and the conveyor may be at least two conveyor strips, one that extends along each of the forks. The conveyor may be a chain conveyor or a belt conveyor. The first and second drives may be bidirectional. The load support may be a platen.

The load support may include at least two telescoping load support sections and the conveyor configured to extend along the load support sections. The conveyor may be stationary with respect to at least the outermost ones of the load support sections as the sections extend and contract if said first drive is operated and said second drive is not operated.

The load support may be extended to deposit loads to and pick loads from a rack adjacent the load handling device. The first drive may extend and retract the load support with respect to the load handling device. A vertical drive may be provided that is operational to drive the load support vertically upward or downward. The vertical drive may be operated to elevate a load being picked from a rack while the first drive is extending the load support and the second drive is propelling the conveyor toward the load handling device. The vertical drive may be operated to lower a load being deposited on a rack while the first drive is retracting the load support and the second drive is propelling the conveyor away from the load handling device. The load support may be extendable in opposite directions to deposit loads to and pick loads from racks on opposite sides of the load handling device.

A load may be picked from a conveying surface by aligning the load support with the conveying surface and operating the second drive to transfer the load from the conveying surface to the load support with the conveyor. A load may be deposited from the load support to a conveying surface by aligning the load support with the conveying surface and operating the second drive to transfer the load from the load support to the conveying surface with the conveyor. A load may be picked from a conveying surface to the load support while concurrently depositing another load from the load support to another conveying surface by aligning the load support with both conveying surfaces and operating the second drive to transfer the load to the load support and the another load from the load support with the conveyor.

These and other objects, advantages and features of this invention will become apparent upon review of the following specification in conjunction with the drawings.

BRIEF DESCRIPTION OF THE DRAWINGS

FIG. 2 is a side elevation view of forks with a conveyor according to the embodiment in FIG. 1 engaging a Euro pallet;

FIG. 3a is a side elevation of the load handling device illustrating the load support in a retracted position;

FIG. 4b is a side elevation of the conveyor illustrating layout and operation of the conveyor in an extended position of the load handling device;

FIG. 5 illustrates an aisle of a load handling system having racks on opposite sides of the load handling device with the forks extending toward a load to pick the load;

DETAILED DESCRIPTION OF THE PREFERRED EMBODIMENT

Figure 1:
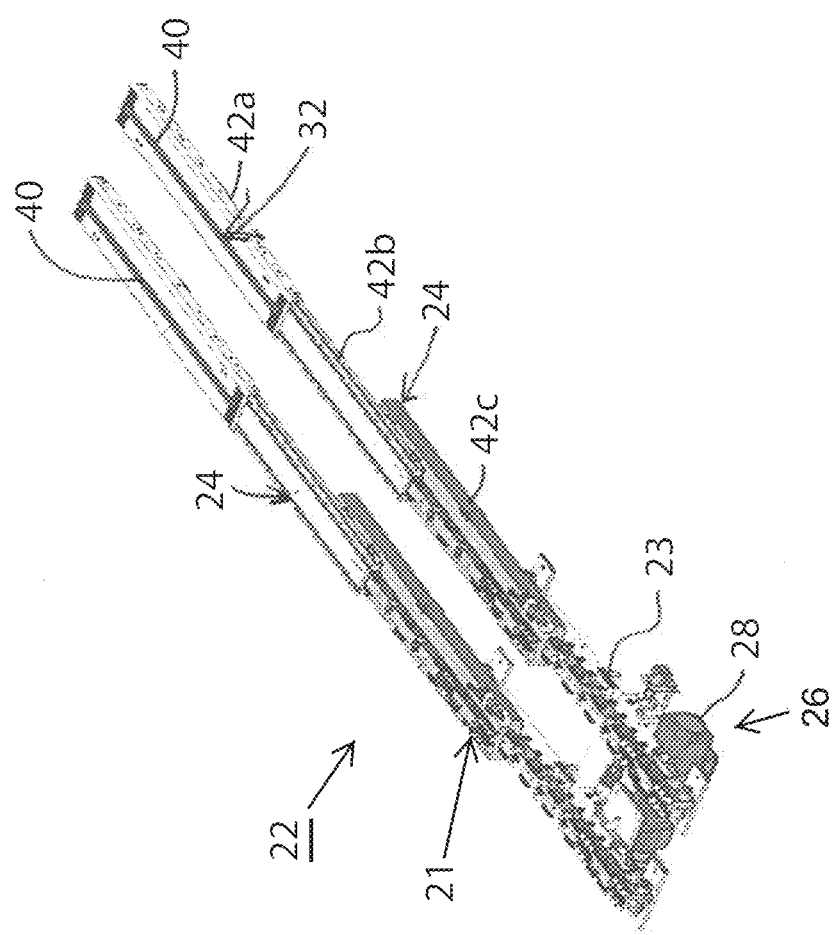
FIG. 1 is a perspective view of a load handling system according to an embodiment of the invention.

Referring now to the drawings and the illustrative embodiments depicted therein, a load handling system 20 having a load handling device 22 (FIG. 1). The load handling device 22 has a base or carriage 23 and a load support 21 supported by the carriage 23 that is configured to engage a load. In the illustrated embodiment, the load support 21 is a pair of forks 24 that are configured to engage a pallet P. However, the load support 21 could alternatively be a platen that is adapted to engage a different type of load. While the invention is described with respect to forks the skilled artisan will understand how it could be applied to a platen or a combination of forks and platen. The load handling device 22 includes a first drive 26 that is adapted to drive the forks 24 with respect to a pallet (FIG. 3a). In the illustrated embodiment, the pallet load handling system 20 is an AS/RS and has a travelling vertical mast 27 that supports load handling device 22 in a vertically adjustable manner (FIGS. 5-15). The forks 24 are made up of telescoping fork sections 42a, 42b, and 42c and a first drive 26 that extends and retracts the forks 24 with respect to the carriage 23 (FIGS. 1, 3a).

Figure 3B:
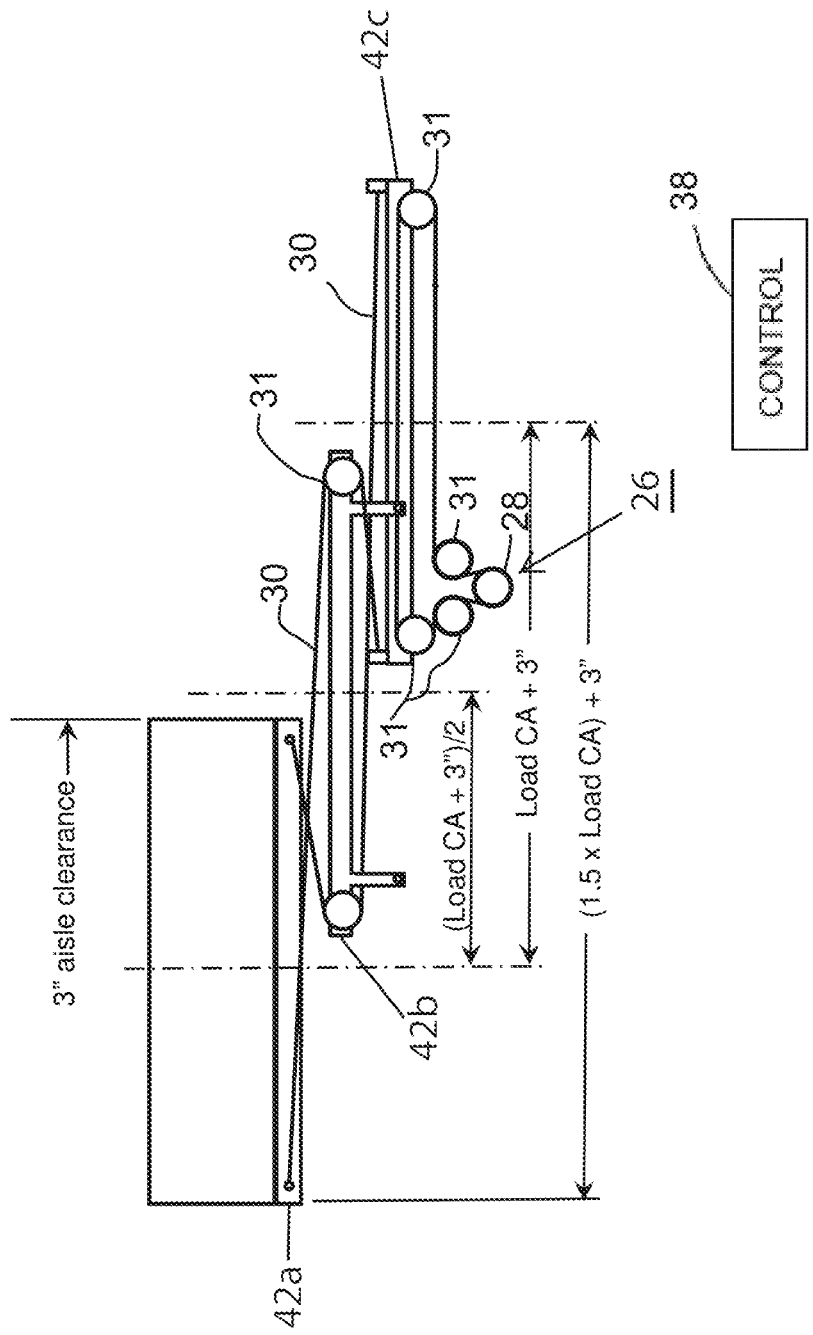
FIG. 3b is side elevation of the load handling device in FIG. 3a illustrating the load support in an extended position.

As is conventional and as illustrated in FIGS. 3a and 3b, the first drive 26 includes a bi-directional motor 28 that propels a fork drive chain 30 in opposite directions to extend and retract telescoping fork sections 42 with respect to each other and the carriage 23 (FIG. 1). The fork drive chain 30 has one end terminated to fork section 42c. It is routed over a sheave 31 located on fork section 42b, then terminated at fork section 42a. The first drive 26 propels section 42b which causes the extension of section 42a (FIGS. 3a, 3b).

Figure 4A:
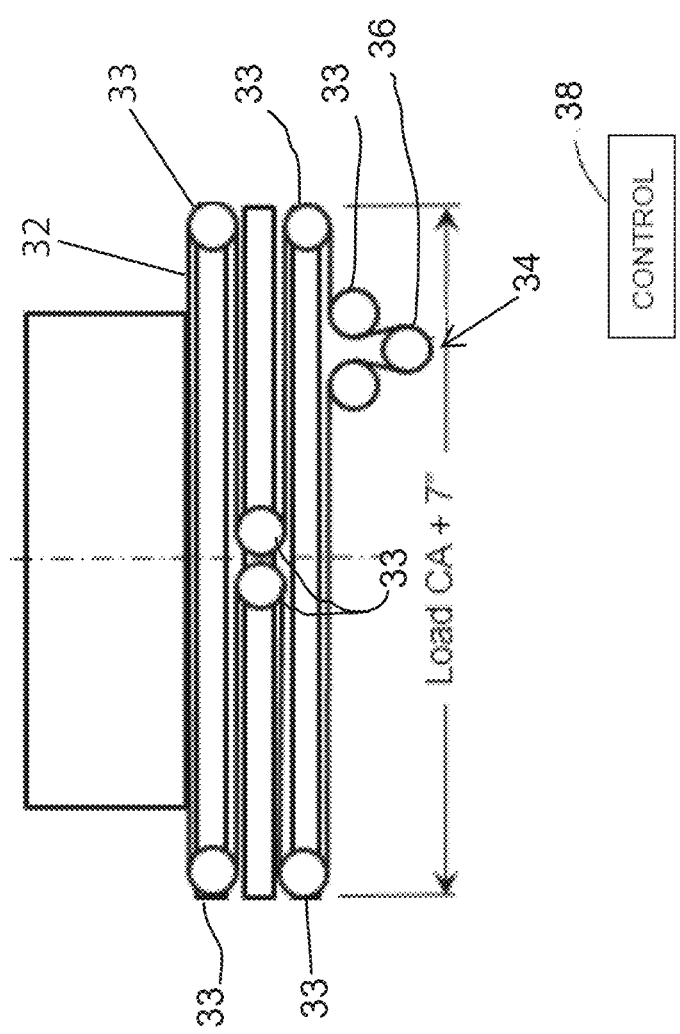
FIG. 4a is a side elevation of the conveyor illustrating layout and operation of the conveyor in a retracted position of the load handling device.
Figure 6:
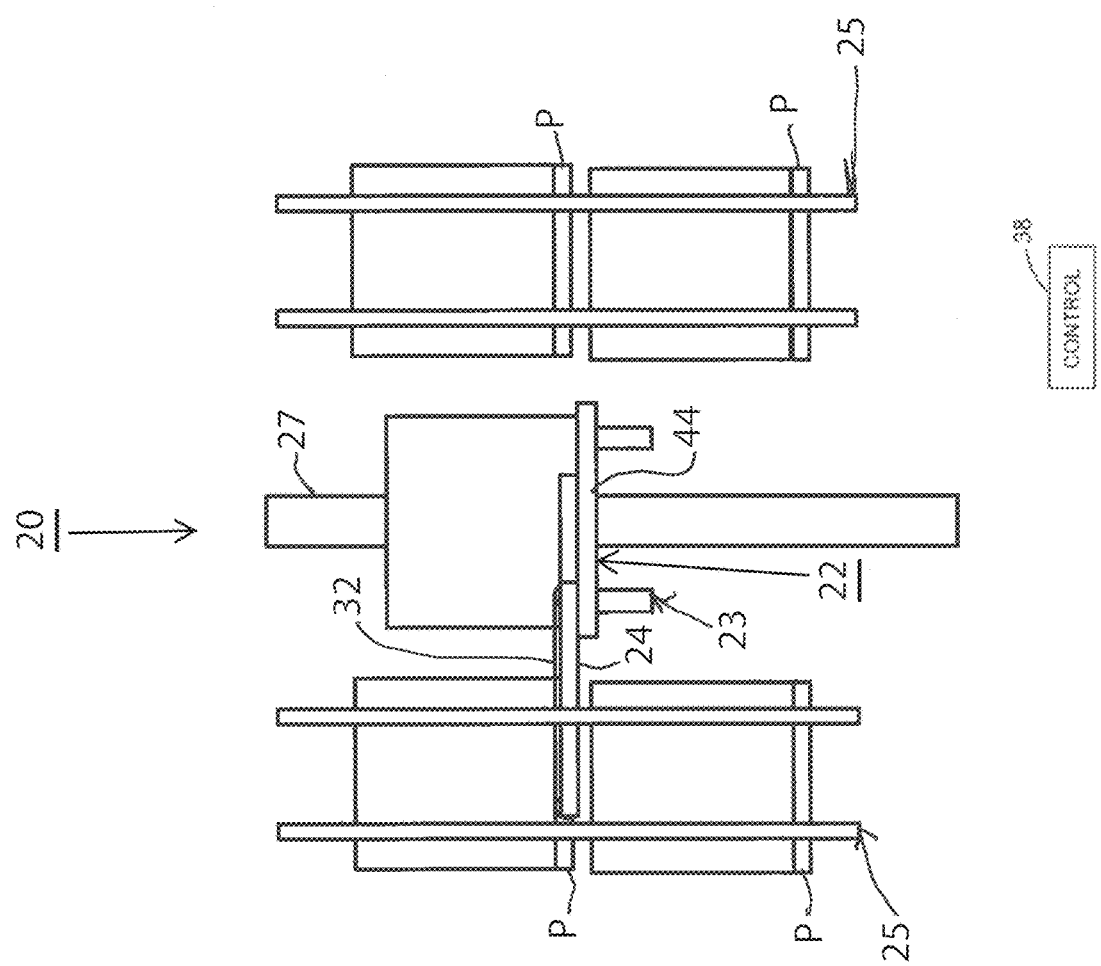
FIG. 6 is the same view as FIG. 5 illustrating further extension of the load support to a position where the conveyor is driven backwards at the rate of extension of the load support.
Figure 7:
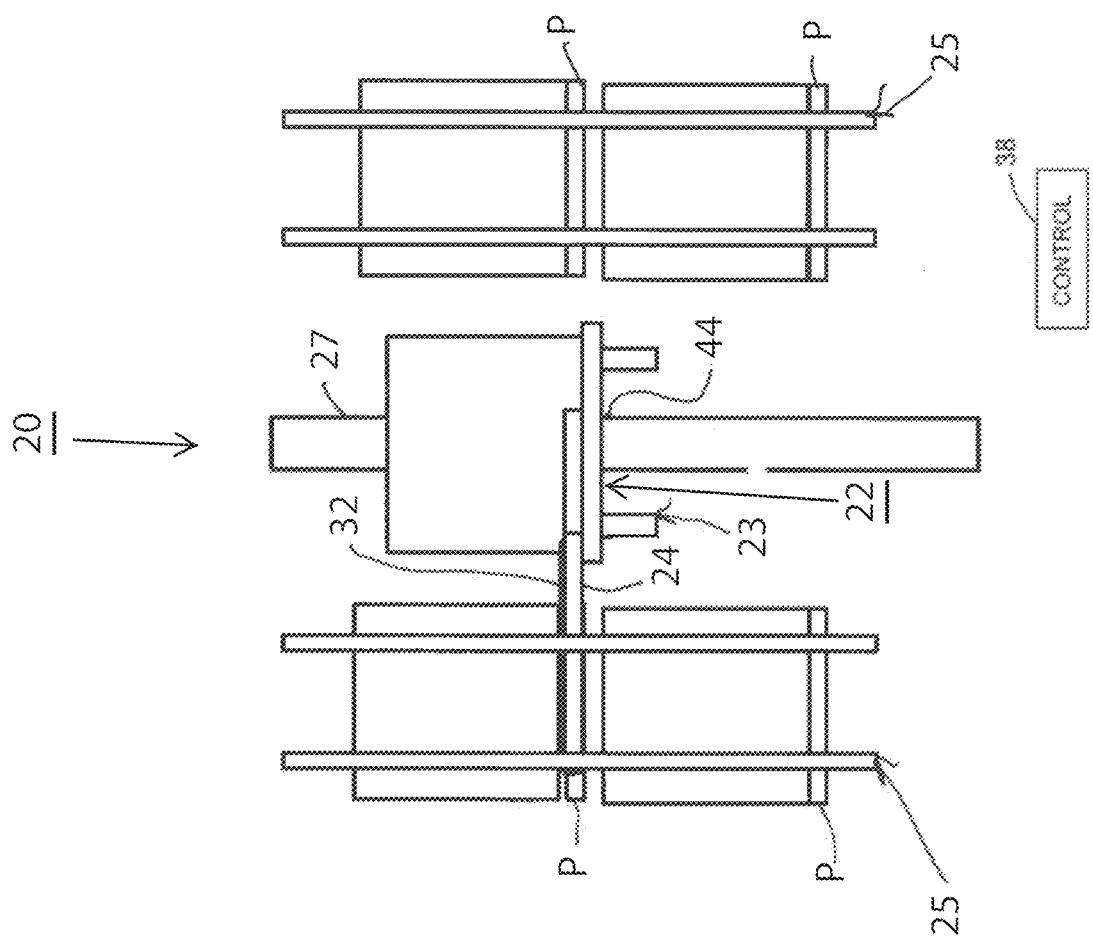
FIG. 7 is the same view as FIG. 6 illustrating yet further extension of the load support with the load handling device being raised with a vertical drive during the last portion of the extension of the load support.
Figure 8:
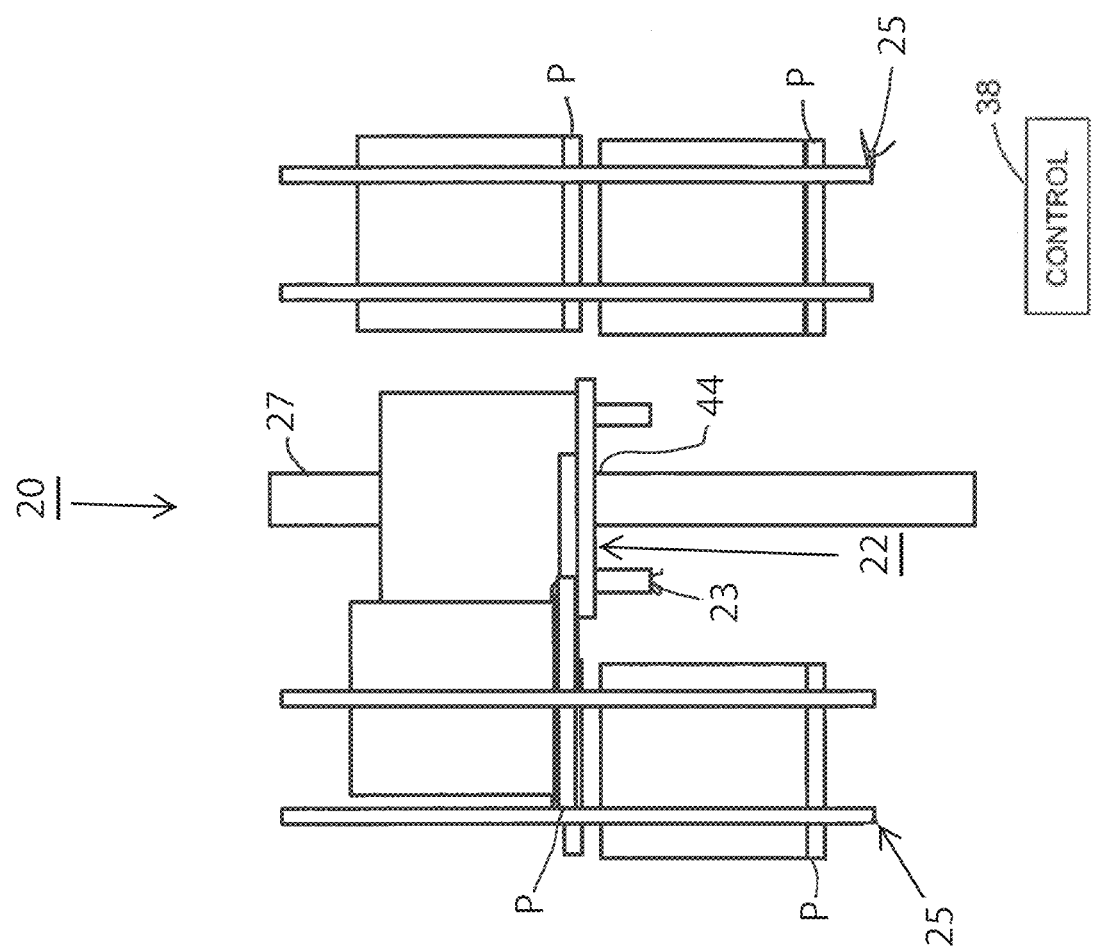
FIG. 8 is the same view as FIG. 7 with the load support beginning to retract toward the load handling device with the picked load.
Figure 9:
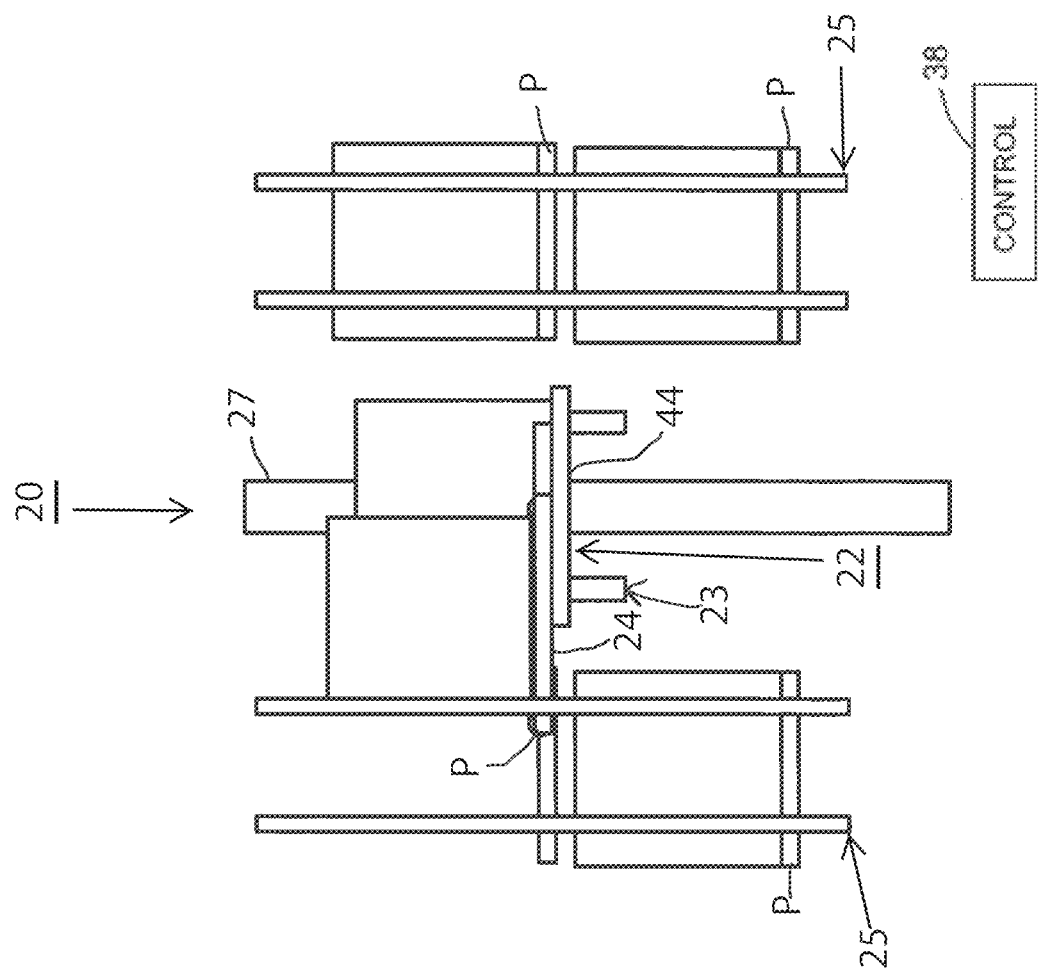
FIG. 9 is the same view as FIG. 8 with the load support almost completely retracted toward the load handling device.
Figure 10:
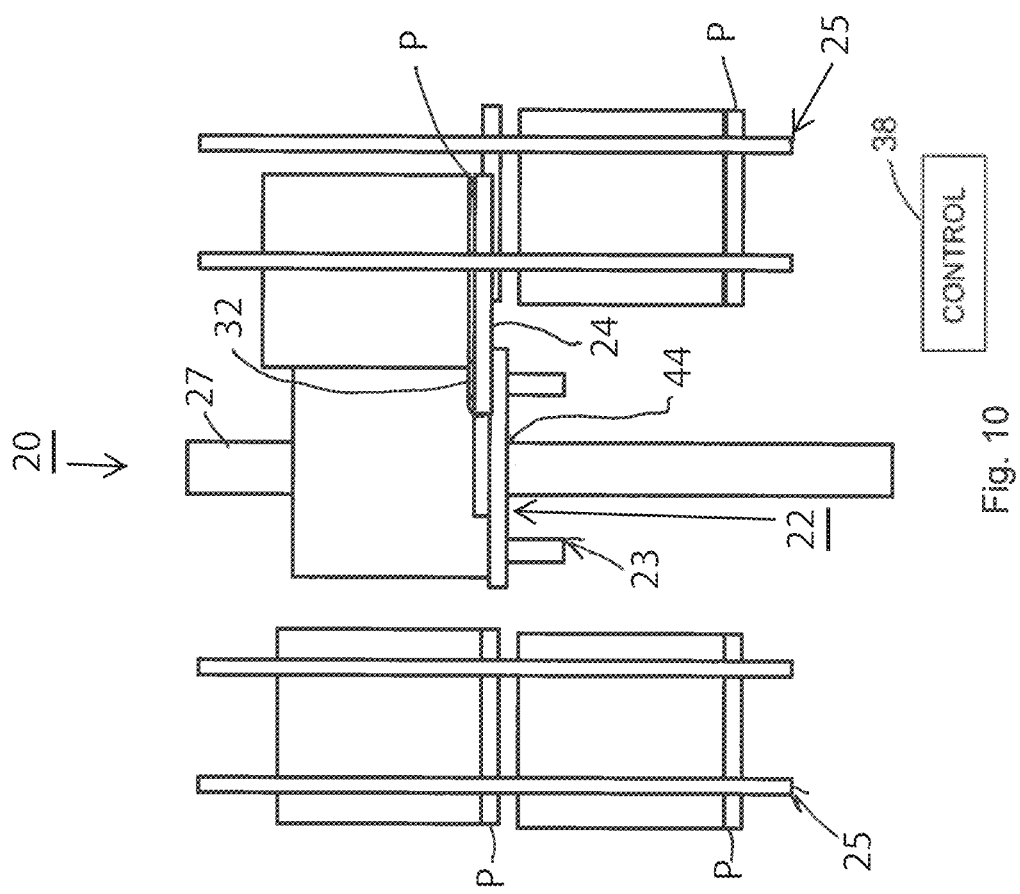
FIG. 10 is the same view as FIG. 5 illustrating the load support supporting a load extending toward a shelf to deposit the load in the rack.
Figure 11:
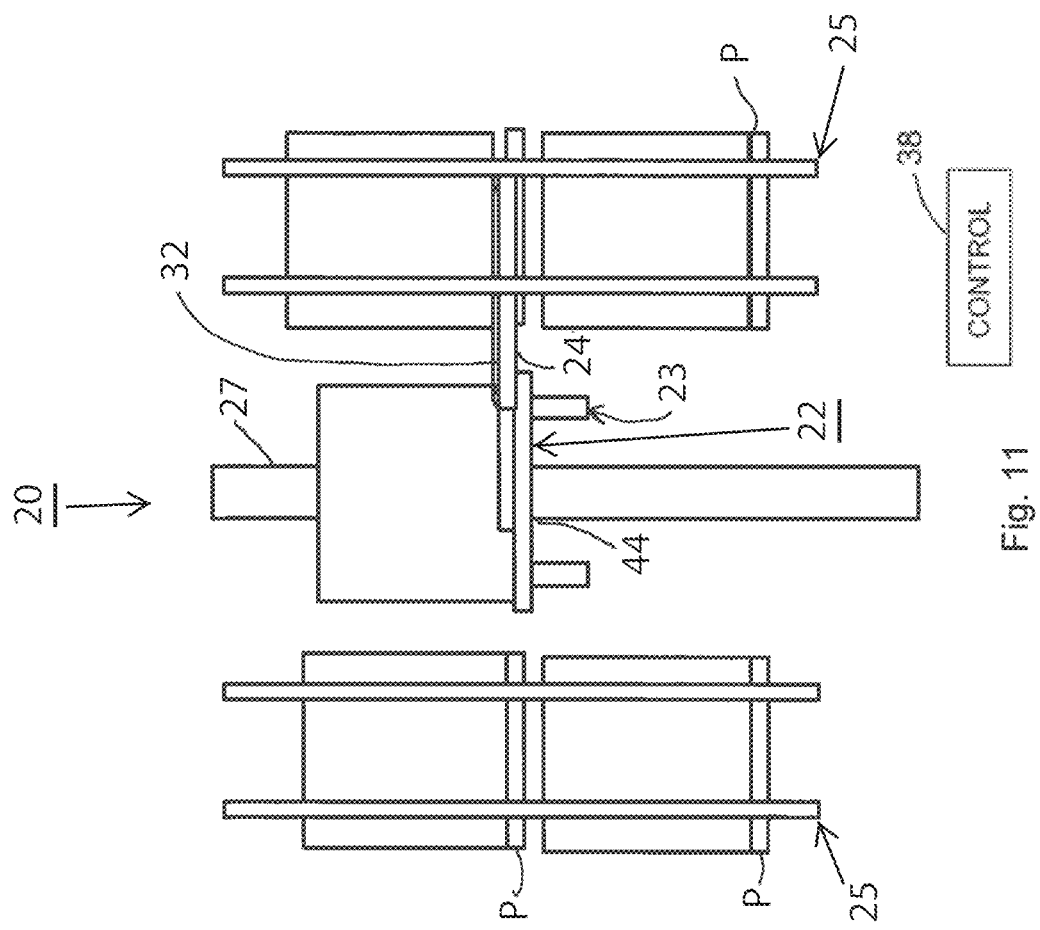
FIG. 11 is the same view as FIG. 10 with the load support not fully extended and the conveyor driving the load ahead of the forks.
Figure 12:
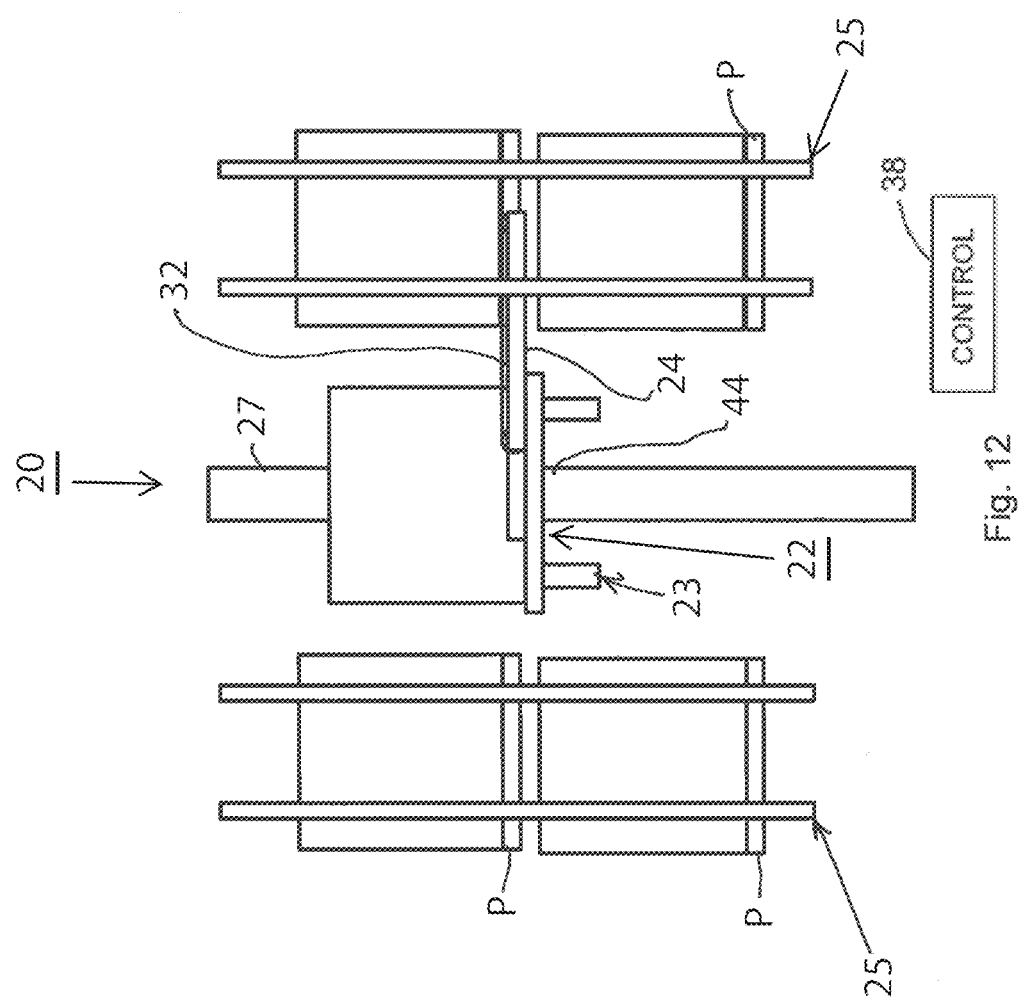
FIG. 12 is the same view as FIG. 11 with the forks fully extended and the conveyor driving the load off the forks as the load support begin to retract with the load handling device lowering the forks to leave the load on the rack.
Figure 13:
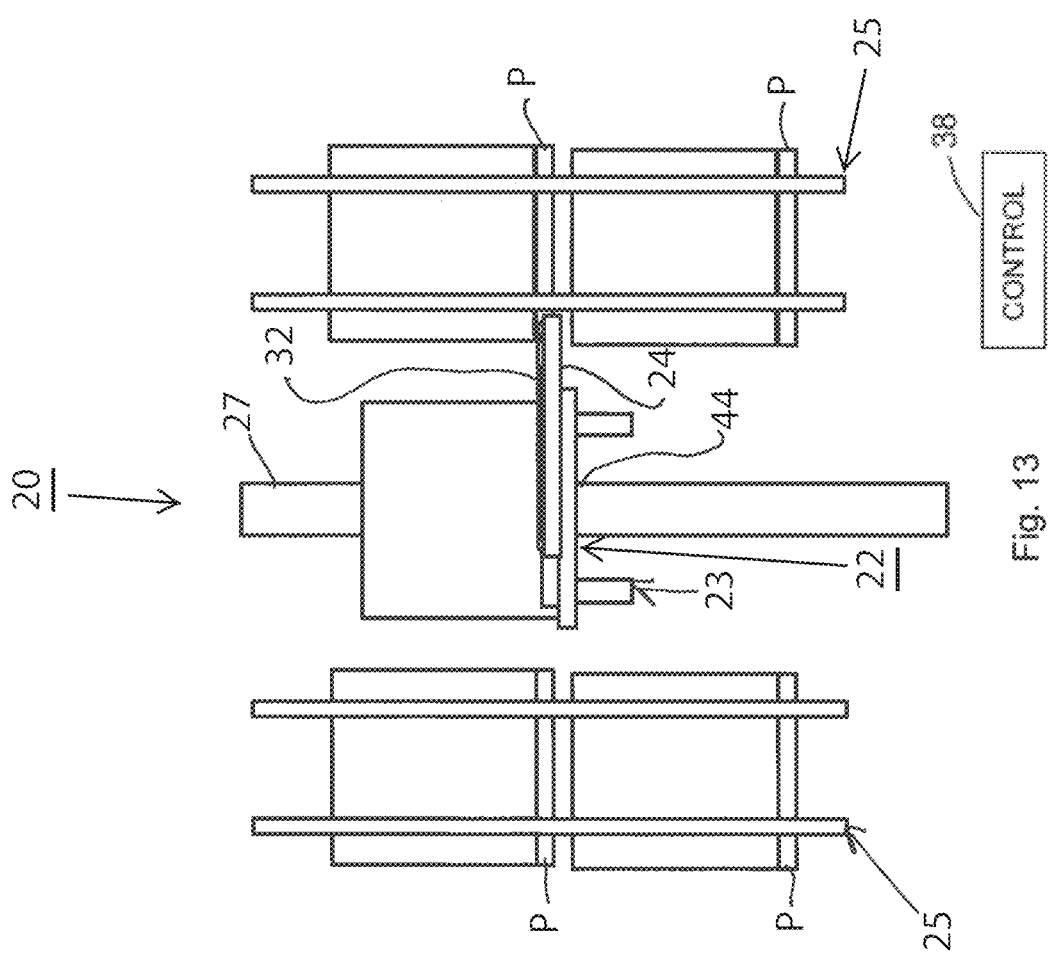
FIG. 13 is the same view as FIG. 12 illustrating the empty load support returning to the load handing device.

The load handling system 20 includes a conveyor 32 that is moveable along the forks 24 and a second drive 34 which has a motor 36 that is adapted to propel the conveyor 32 with respect to the forks 24 (FIGS. 4a, 5). A control 38 is adapted to operating the first and second drives 26, 34 independent from each other (FIGS. 3a, 4a). In this manner, the second drive 34 can operate the conveyor 32 in either direction irrespective of the extended positions of fork sections 42. In the illustrated embodiment, the conveyor 32 is made up of a pair of conveyor strips 40 one that extends along each of the forks 24 (FIG. 1). The conveyor 32 can be any form of conveying device but preferably is either a chain conveyor or a belt conveyor. The second motor 36 is a bi-directional motor that is capable of driving the conveyor 32 in opposite directions and has a brake that maintains the position of the conveyor 32 when it is not being driven (FIGS. 4a, 4b).

As best seen in FIGS. 4a and 4b, the conveyor 32 is reeved around a series of sprockets 33. Two sprockets 33 are positioned at opposite ends of outermost fork section 42a. Two sprockets 33 are positioned at a middle portion of intermediate fork section 42b and two sprockets 33 are positioned at opposite end portions of inner fork section 42c. As the first drive 26 extends and contracts the telescoping fork sections 42a-42c, the conveyor 32 is stationary with respect to at least the outermost fork sections 42a as the forks 24 are extended and contracted if the second drive 34 is not operated. This is because links of the conveyor chain are exchanged between fork sections 42b and 42c but those on fork section 42a remain stationary on the fork section.

Figure 14:
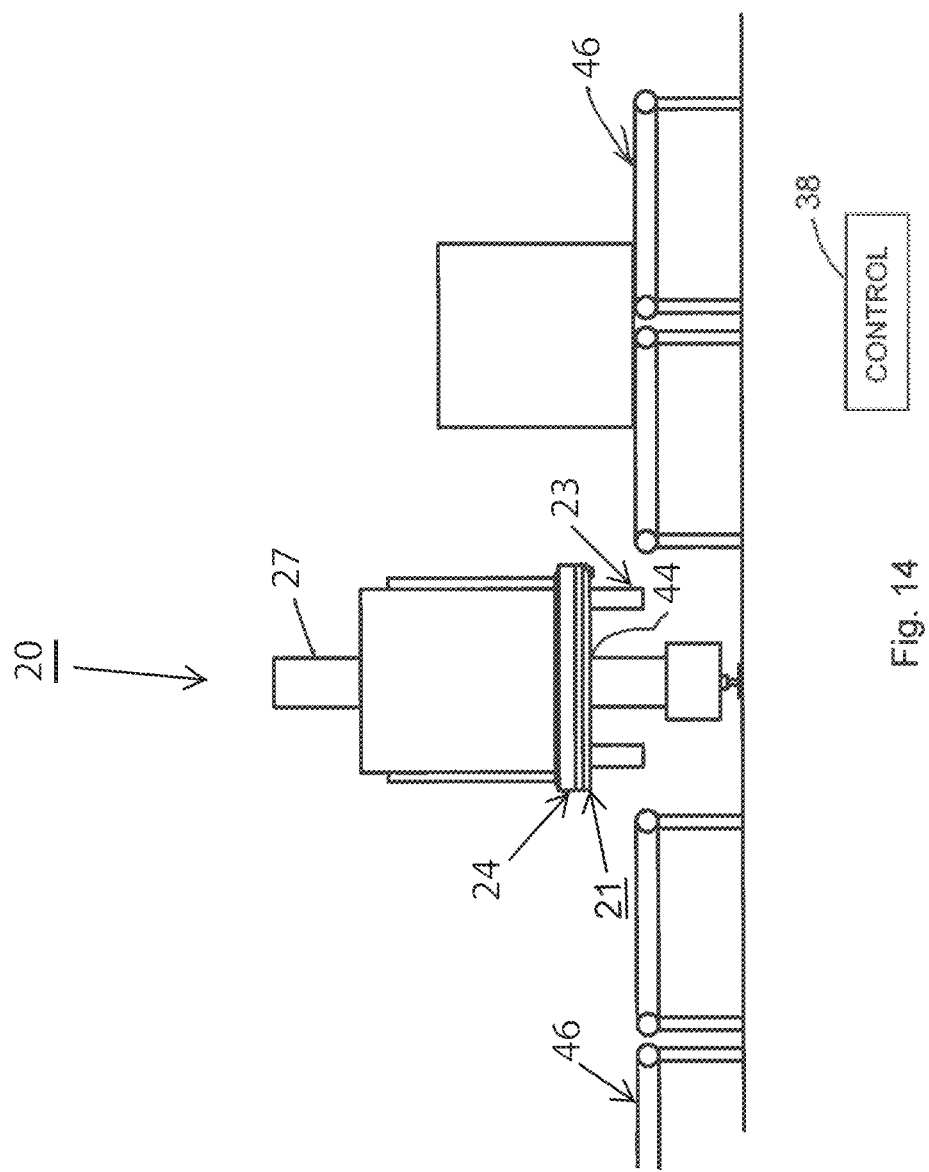
FIG. 14 illustrates a load handling system according to an embodiment of the invention used to pick a load from or deposit a load to an end of aisle conveying surface.
Figure 15:
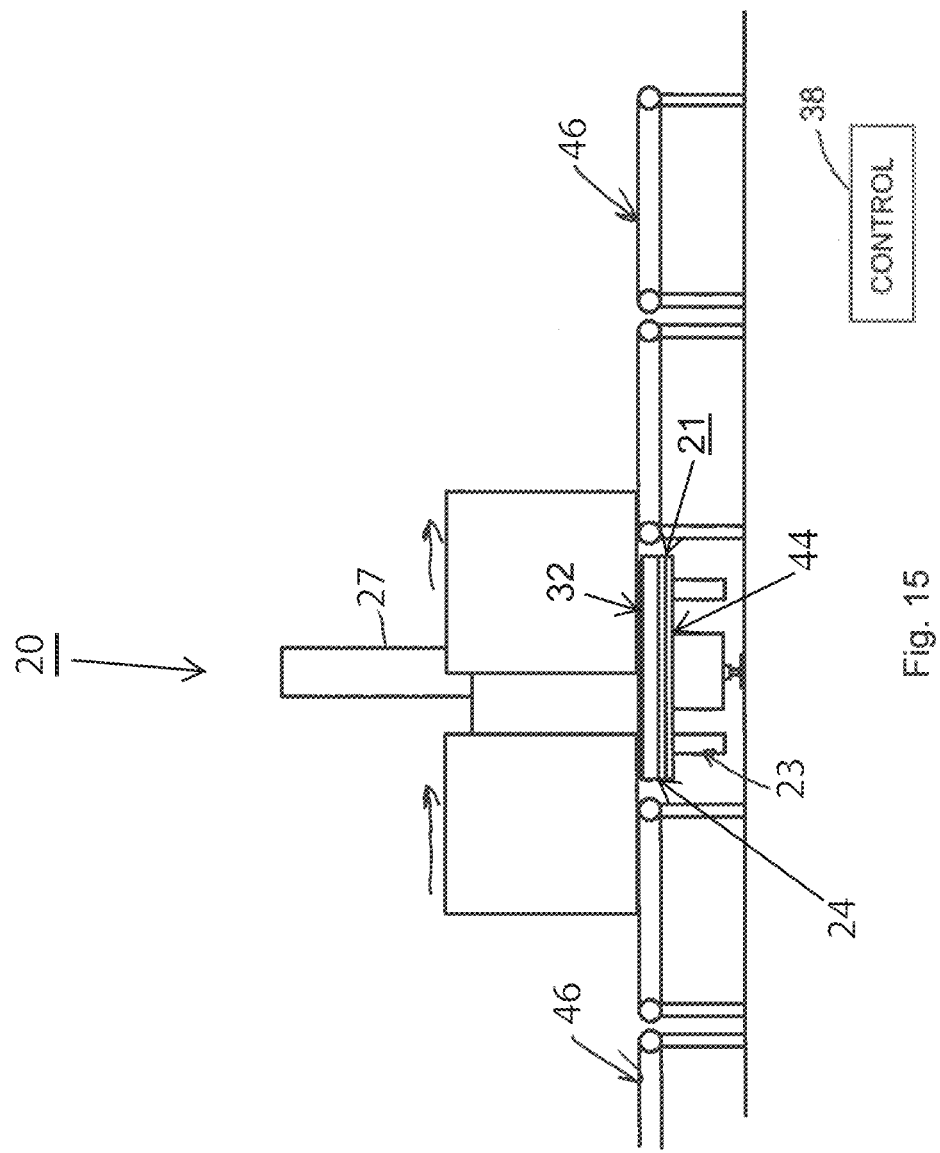
FIG. 15 is the same view as FIG. 14 showing a load being deposited to the end of aisle conveying surface from the load support using the conveyor and conveying surface at the same time that another load is being picked to the load support from the end of aisle conveying surface.

The carriage 23 of the load handling device 22 includes a vertical drive 44 that is operational to drive the forks 24 vertically upward or downward (FIGS. 14, 15). This vertical movement is part of picking pallets from a rack 25 and depositing a pallet to a rack 25. In the illustrated embodiment, the vertical drive 44 is incorporated in the carriage 23 and/or vertical mast 27 and provides for vertical movement of the carriage 23 with respect to the vertical mast 27. This vertical movement is also used to position the base at the proper vertical height to access a rack 25 position or access conveyor. The control 38 operates the vertical drive 44 to elevate a pallet being picked from a rack 25 while the first drive 26 is extending the forks 24 (FIGS. 3a, 3b) and the second drive 34 is propelling the conveyor 32 (FIGS. 4a, 4b) toward the carriage 23 (FIGS. 5-13). The control 38 operates the vertical drive 44 to lower a pallet being deposited on a rack 25 while the first drive 26 extends the forks 24 and the second drive 34 is propelling the conveyor 32 away from the carriage 23. The forks 24 are extendable in opposite directions to deposit pallets to and pick pallets from racks 25 on opposite sides of the load handling device 22 as best seen by comparing FIGS. 5 through 13.

The control 38 is adapted to control the load handling system 20 to pick a load from a conveying surface 46 that is parallel to the forks 24 by aligning the forks 24 with the conveying surface 46 and operating the second drive 34 at the same speed as the conveying surface 46 to transfer the load from the conveying surface 46 to the forks 24 with the conveyor 32, as best seen in FIGS. 14 and 15. This can be accomplished without the need to extend the forks 24 and without the need for any lift device to elevate the load above the conveying surface 46. This saves both time and installed cost. Similarly, the control 38 is adapted to control the load handling system 20 to deposit a load from the forks 24 to the conveying surface 46 by aligning the forks 24 with the conveying surface 46 and operating the second drive 34 at the same speed as the conveying surface 46 to transfer the load from the forks 24 to the conveying surface 46 with the conveyor 32. This can be accomplished without the need to extend the forks 24 and without the need for any lowering device to lower the load to the conveying surface 46. Also, the control 38 is adapted to control the load handling system 20 to pick a load from a conveying surface 46 to the forks 24 from one side of the carriage 23 while concurrently depositing another load from the forks 24 to another conveying surface 46 on an opposite side of the carriage 23 by aligning the forks 24 with both conveying surfaces and operating the second drive 34 to transfer the load to the forks 24 and the another load from the forks 24 with the conveyor 32 as best seen in FIG. 15.

Figure 16:
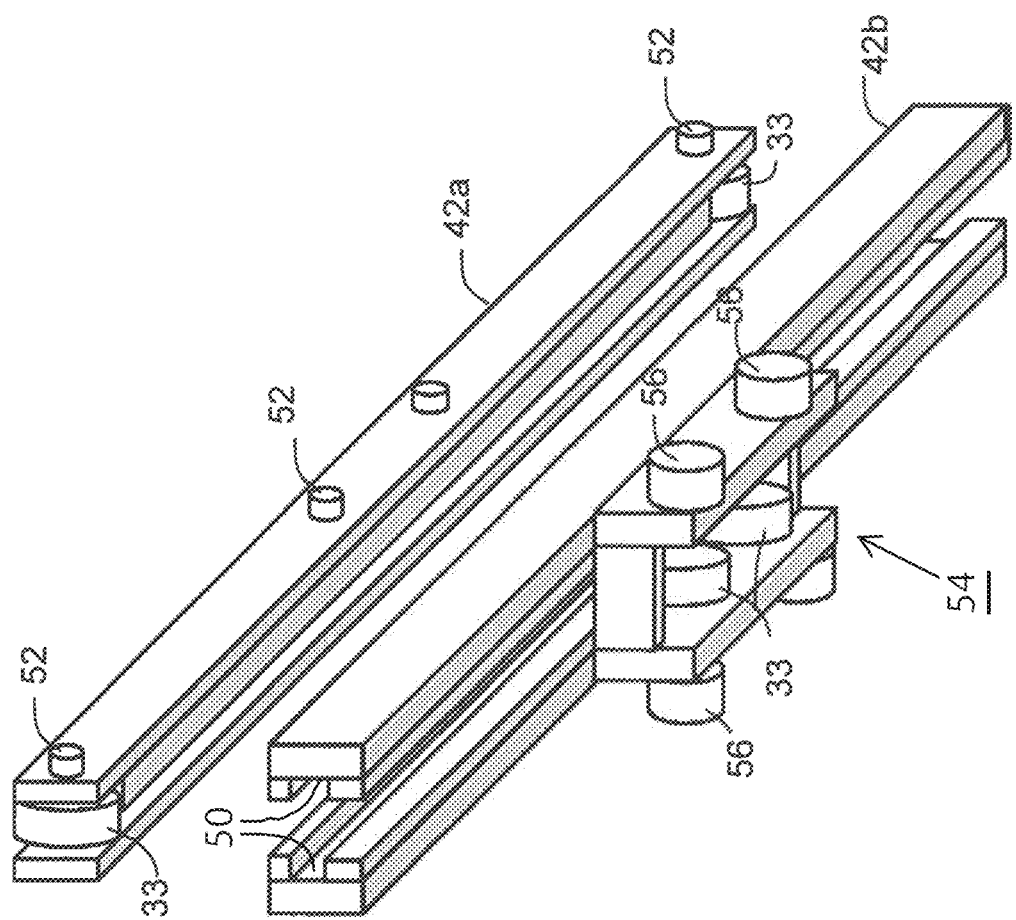
FIG. 16 is a perspective view taken from below of extendable fork sections.

A configuration of telescoping fork sections 42a and 42b is illustrated in FIG. 16. Fork section 42b has facing internal grooves 50 that receive rollers 52 that are positioned on fork section 42a to allow fork section 42a to extend and retract with respect to fork section 42b. Sprockets 33 for a conveyor strip 40 are mounted at opposite ends of fork section 42a. An assembly 54 is mounted to a lower surface of fork section 42b with rollers 56 that are received in grooves (not shown) in fork section 42c to allow fork section 42b to extend and retract with respect to fork section 42c. Sprockets 33 for a conveyor strip 40 are attached in assembly 54. Other arrangements are possible.

Figure 17:
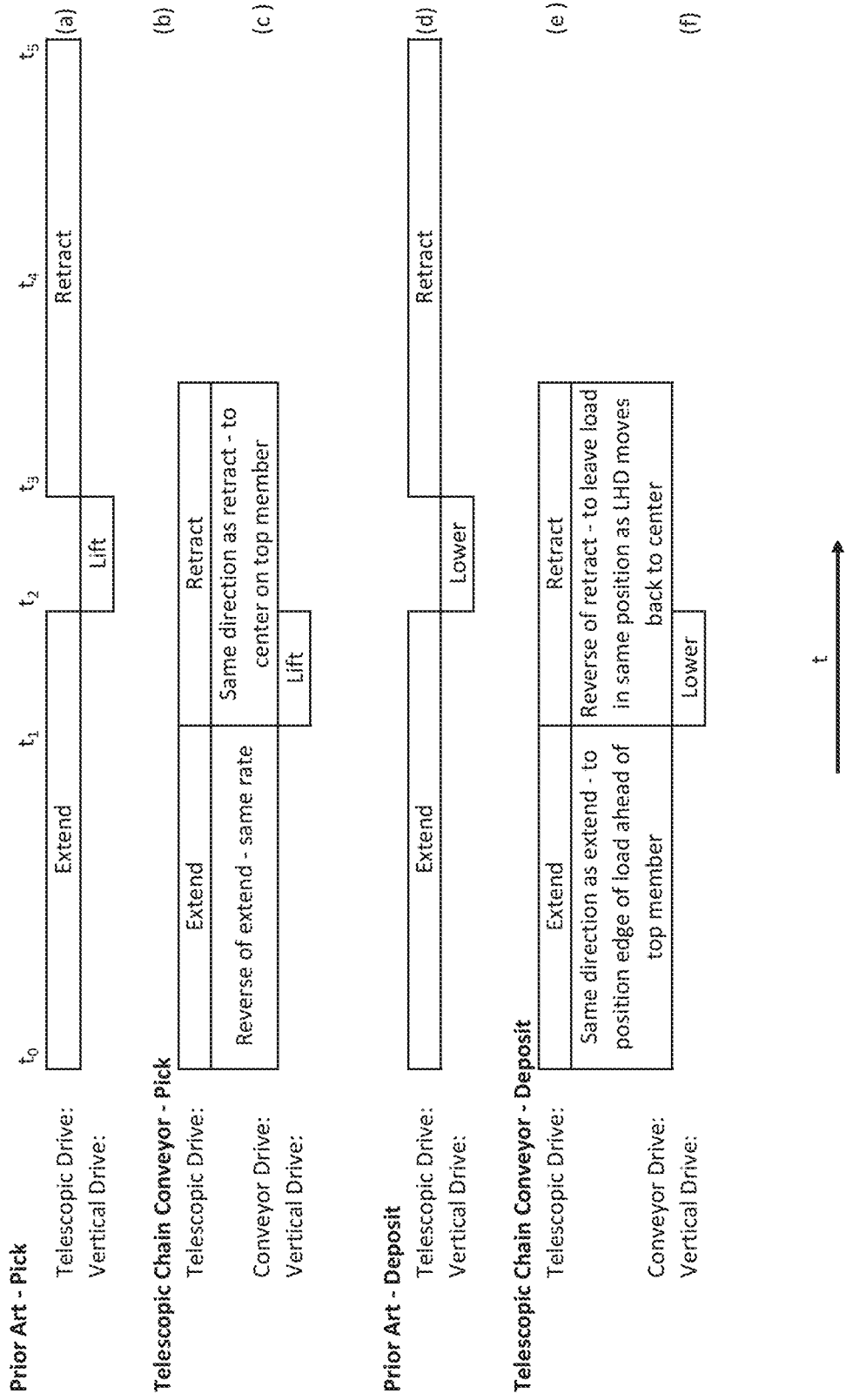
FIG. 17 is a timing diagram comparing operation of a load handling system according to an embodiment of the invention with a conventional load handling system.

A comparison of timing between operation of the load handling system 20 and the prior art is illustrated in FIG. 17. In order to pick a pallet P from a rack, the conventional fork illustrated at (a) extends from time $t_0$ to $t_2$ to engage the pallet P. The forks are elevated from time $t_2$ to $t_3$ with a vertical drive to lift the pallet P off the rack. The forks are then retracted from time $t_3$ to $t_5$ to return the pallet P to the carriage. In order to pick the same pallet P using the load handling system 20 as illustrated at (b), the forks 24 are extended while the conveyor 32 is driven toward the carriage 23 at the same rate as the rate of extension as shown at (b). Once the conveyor 32 draws the center of gravity of the pallet P firmly on the forks 24, such as $\frac{2}{3}^{rd}$ of the pallet P depth at $t_1$, the forks 24 begin to raise via the vertical drive 44 as the conveyor 32 continues to draw the pallet P onto the forks 24 from $t_0$ to $t_1$. The forks 24 do not need to fully extend the full stroke as the conveyor 32 will draw the pallet P to the center of fork section 42a. Then the forks 24 can immediately begin retracting at $t_1$ with the conveyor 32 stopped since the pallet P is already on the forks 24. Therefore, the pallet P will be returned to the carriage 23 by $t_4$. Cycle time is reduced because the pallet P is pulled onto the forks 24 by the conveyor 32 while the forks 24 are still extending and the forks 24 do not need to stop and raise. Also, the forks 24 do not need to fully extend before returning since the conveyor 32 will bring the pallet P to the center of top fork section 42a. Cycle time can be reduced by a number of seconds which enhances overall system throughput.

In a similar fashion, in order to deposit a pallet P to the rack, the conventional fork is illustrated at (d). The forks extend from $t_0$ to $t_2$ with the pallet P supported. The forks stop extending and are lowered from $t_2$ to $t_3$ to lower the pallet P onto the rack. The lowered forks then retract to the carriage from $t_3$ to $t_5$. As shown at (e), the load handling system 20 deposits a pallet P to the rack by the forks 24 extending from $t_0$ to $t_1$. Prior to $t_1$, the conveyor strips 40 begin to drive away from the carriage 23 to drive the pallet P ahead of the forks 24 while the pallet P is still supported by the forks 24. At $t_1$ the forks 24 are fully extended and the forks 24 are lowered from $t_1$ to $t_2$ while the conveyor strips 40 continue to be driven in order to deposit the pallet P on the rack. The forks 24 are then fully retracted by $t_3$ or $t_4$. Once again, cycle time is reduced over the prior art by the forks 24 not needing to fully extend and the fork 24 extension overlapping with lowering motion.

While the invention is illustrated for use with an automated storage and retrieval system it has application in material handling systems utilizing a load support such as forks, or platens, such as automated fork lift trucks, AGVs, load transfer cars, and the like. Thus, it is seen that the present invention is capable of greatly increasing system throughput by reducing cycle time of the load handling device which reduces overall access cycle time. Since certain systems must be sized in order to accommodate a certain pallet rate, it is possible that a smaller system may be needed with the present invention than with conventional systems.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:
1. A load handling system, comprising:
   a load handling device comprising a load support that is configured to engage a load, and a first drive that is adapted to drive said load support with respect to a load; and
   a conveyor moveable along said load support, and said conveyor comprising a second drive that is adapted to propel said conveyor with respect to said load support;
   a control that is adapted to operate said first and second drives to engage the load with the load support, wherein said control is adapted to operate said first and second drives independent from each other, and wherein said first and second drives are bi-directional; and
   a vertical drive that is operational to drive said load support vertically upward or downward, wherein said control is adapted to operate said vertical drive to elevate a load being picked from a rack while said first drive is extending said load support, and said second drive is propelling said conveyor to move a load toward said load handling device;
   wherein said control is further adapted to operate said vertical drive to lower a load being deposited on a rack while said first drive is retracting said load support, and said second drive is propelling said conveyor to move a load away from said load handling device; and
   wherein said load support comprises a pair of forks and wherein said conveyor comprises a pair of conveyor strips, wherein said pair of conveyor strips extends along each of said forks.
2. The system according to claim 1, wherein said conveyor comprises a chain conveyor or a belt conveyor.
3. The system according to claim 1, wherein said load support is extendable to deposit loads to and pick loads from a rack adjacent said load handling device and wherein said first drive extends and retracts said load support with respect to said load handling device.

4. The system according to claim 3, wherein said load support is extendable in opposite directions to deposit loads to and pick loads from racks on opposite sides of said load handling device.

5. The system according to claim 1, wherein said control is further adapted to retrieve a load from a conveying surface by aligning said load support with said conveying surface, and operating said second drive to transfer the load from the conveying surface to the load support with said conveyor, and wherein said control is adapted to deposit a load from the load support to a conveying surface by aligning said load support with said conveying surface and operating said second drive to transfer the load from the load support to said conveying surface with said conveyor.

6. The system according to claim 5, wherein said control is adapted to retrieve a load from a conveying surface to the load support while concurrently depositing another load from the load support to another conveying surface by aligning the load support with both said conveying surfaces and operating said second drive to transfer the load to the load support and another load from the load support with said conveyor.

7. A load handling system, comprising:
a load handling device comprising a load support that is configured to engage a load, and a first drive that is adapted to drive said load support with respect to a load; and
a conveyor moveable along said load support, and said conveyor comprising a second drive that is adapted to propel said conveyor with respect to said load support;
a control that is adapted to operate said first and second drives to engage the load with the load support, wherein said control is adapted to operate said first and second drives independent from each other, and wherein said first and second drives are bi-directional;
a vertical drive that is operational to drive said load support vertically upward or downward, wherein said control is adapted to operate said vertical drive to elevate a load being picked from a rack while said first drive is extending said load support, and said second drive is propelling said conveyor to move a load toward said load handling device;
wherein said control is further adapted to operate said vertical drive to lower a load being deposited on a rack while said first drive is retracting said load support, and said second drive is propelling said conveyor to move a load away from said load handling device; and
wherein said load support comprise at least two telescoping fork sections and wherein said conveyor is configured to extend along said fork sections and wherein said conveyor is stationary with respect to at least the outermost ones of said fork sections as said forks extend and retract if said first drive is operated and said second drive is not operated.

8. A method of handling a load with a load handling device, said load handling device includes: a load support that is configured for engaging a load, and a first drive adapted to drive said load support with respect to a load, said method comprising:
providing a conveyor moveable along said load support, and a second drive that is adapted to propel said conveyor with respect to said load support;
operating said first and second drives to engage a load with the load handling device including operating said first and second drives independent from each other, wherein said first and second drives are bi-directional;
providing a vertical drive that is operational to drive said load support vertically upward or downward including operating said vertical drive to elevate a load being picked from a rack while said first drive is extending said load support, and while said second drive is propelling said conveyor to move a load toward said load handling device;
operating said vertical drive to lower a load being deposited on a rack while said first drive is retracting said load support and while said second drive is propelling said conveyor to move a load away from said load handling device; and
wherein said load support comprises a pair of forks and wherein said conveyor comprises a pair of conveyor strips, wherein said pair of conveyor strips extends along each of said forks.

9. The method according to claim 8, wherein said conveyor comprises a chain conveyor or a belt conveyor.

10. The method according to claim 8, wherein said forks comprise at least two telescoping fork sections and wherein said conveyor is configured to extend along said fork sections.

11. The method according to claim 10, wherein said conveyor is stationary with respect to at least the outermost ones of said fork sections as said load support extends and retracts when said first drive is operated and said second drive is not operated.

12. The method according to claim 8, including extending said load support to deposit the load to and pick the load from a rack adjacent to said load handling device, wherein said first drive extends and retracts said load support with respect to said load handling device.

13. The method according to claim 8, wherein said load support is extendable in opposite directions to deposit loads to and pick loads from racks on opposite sides of said load handling device.

14. A method of handling a load with a load handling device, said load handling device including: a load support that is configured to engage a load, and a first drive adapted to drive said load support with respect to the load, said method comprising:
providing a conveyor moveable along said load support, said conveyor including a second drive that is adapted to propel said conveyor with respect to said load support;
operating said first and second drives to engage the load with the load handling device, said operating said first and second drives includes picking a load from a conveying surface by aligning said load support with said conveying surface, and operating said second drive to transfer the load from the conveying surface to the load support with said conveyor;
wherein depositing the load from the load support to a conveying surface includes aligning said load support with said conveying surface and operating said second drive to transfer the load from the load support to said conveying surface with said conveyor; and
wherein said load support comprises a pair of forks and wherein said conveyor comprises a pair of conveyor strips, wherein said pair of conveyor strips extends along each of said forks.

15. The method according to claim 14, including picking a load from a conveying surface to the load support while concurrently depositing another load from the load support to another conveying surface by aligning the load support with both said conveying surfaces, and operating said second drive to transfer the load to the load support and the another pallet from the load support with said conveyor.

\* \* \* \* \*